73-651 SR CROSS REFERENCE SEARCH ROOM

XR 3,400,274

Sept. 3, 1968 R. D. HAWKINS 3,400,274

PHOTOSENSITIVE FREQUENCY RESPONSIVE APPARATUS
UTILIZING FREELY VIBRATING ELEMENTS

Filed March 29, 1965 2 Sheets-Sheet 1

INVENTOR.
ROBERT D. HAWKINS
BY
H P Terry
ATTORNEY

3400274
OR IN 250/230

INVENTOR.
ROBERT D. HAWKINS
BY
H P Terry
ATTORNEY

United States Patent Office 3,400,274
Patented Sept. 3, 1968

3,400,274
PHOTOSENSITIVE FREQUENCY RESPONSIVE APPARATUS UTILIZING FREELY VIBRATING ELEMENTS

Robert D. Hawkins, Greenlawn, N.Y., assignor to Sperry Rand Corporation, Great Neck, N.Y., a corporation of Delaware Filed Mar. 29, 1965, Ser. No. 443,589
4 Claims. (Cl. 250—230)

The present invention relates to signal responsive apparatus and is particularly useful as a spectrum recorder or analyzer.

The present invention concerns signal responsive apparatus of the type generally shown in U.S. patent application S.N. 185,064, filed April 4, 1962 in the name of Robert D. Hawkins and entitled, "Frequency Responsive Apparatus", now patent No. 3,213,197, and utilizes an assembly which can be self-programmed to discern a desired signal from other signals or can be made responsive to provide an output signal representative of a desired plurality of input signals. The assembly includes an array of elements generally comprising several hundred to several thousand freely vibrating elements each transmitting or controlling energy, normally in the form of light. The elements which may be in the form of fibers or reeds are mounted on a common base in cantilevered fashion in order that each fiber vibrates in a manner characterized by its mechanical resonant frequency or Q and its free length. The base is mounted on an electromechanical transducer which causes the base and thus the elements to vibrate in accordance with an input signal to the transducer. With all of the elements having the same cross-sectional dimension, the free length determines the resonant frequency in order that a wide frequency spectrum is covered by an array having a large plurality of cantilevered elements.

In order to provide an array with a continuous and precise frequency responsive spectrum, it is desirable that all of the elements have exactly the same cross-sectional dimensions. It has been found that the manufacturing tolerance of the cross-sectional dimensions can be held much more precisely using metallic elements than with quartz elements particularly in smaller sizes. However, metallic elements do not conduct light and therefore a reflective type of frequency responsive apparatus in accordance with the present invention is mandatory.

Further, in accordance with the present invention, the mask associated with the elements for blocking undesired signals is then made by a novel reflex exposure technique.

Therefore, it is an object of the present invention to provide reflective type of frequency responsive apparatus.

It is another object of the present invention to provide a mask and a method of making said mask by reflex exposure techniques suitable for reflective type of frequency responsive apparatus.

These and other objects will become apparent by referring to the drawings in which.

Figure 1:
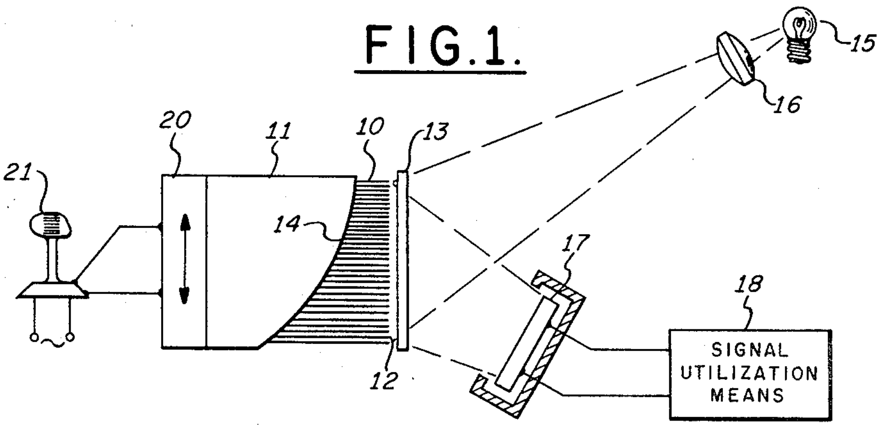
FIG. 1 is a schematic diagram of a reflective type of device incorporating the present invention.

Referring now to FIG. 1, a frequency analyzer of the type generally disclosed in said U.S. patent application S.N. 185,064 is shown with the principal difference being that the fibers 10 of the array 11 are metallic and thus the light instead of being transmitted through the fibers 10 is reflected from the polished ends 12 of the fibers 10 and the mask 13 is made by a reflex exposure technique in a manner to be explained. The metallic fibers 10 are embedded in a common base 11 in order that their free ends extend from the base 11 at unequal free lengths in cantilevered fashion to have individual free lengths as defined by the interface 14 between the base 11 and the fibers 10, whereby the fibers 10 may vibrate at individual preselected frequencies associated with their respective natural frequencies in accordance with the teaching of said U.S. patent application S.N. 185,064 as well as U.S. patent application S.N. 284,712 entitled "Frequency Responsive Apparatus" filed May 31, 1963 in the name of Robert D. Hawkins. The polished ends 12 of the fibers 10 are disposed proximate the mask 13. Light from a source 15 is passed through collimating lenses 16 to provide collimated light which is transmitted through the mask 13, impinges upon the polished ends 12 of the fibers 10 and tends to be reflected back through the mask 13 to be received by a photocell 17 which in turn is connected to a signal utilization means 18.

An electromechanical transducer 20 which may be in the form of a piezo-electric crystal vibrator is mounted on one side of the base 11 and connected to receive electrical signals from a microphone 21. The audio signals spoken into the microphone 21 are converted to electrical signals which cause the transducer 20 to vibrate the base 11 and thus the fibers 10. Each of the fibers 10 or preferably each of a group of fibers 10 project at different lengths from the base 11 and thus have different resonent frequencies in accordance with the theory explained in said U.S. patent applications S.N. 185,064 and 284,712. The amplitude of motion of the fibers 10 is a function of the transmissibility or Q of the fiber at its resonant frequency and the corresponding frequency content of the input audio signal which is applied mechanically to base 11.

Generally the mask 13 is programmed to discern a particular movement of the fibers 10 associated with a particular audio signal. During the application of this signal certain of its frequency components will correspond to the resonant frequencies of certain of the fibers 10 causing them to vibrate at varying amplitudes. The mask 13 may be prepared in any of the ways generally described in said U.S. patent application Ser. No. 284,712, the difference being that the memory programmed on the finished mask 13 is made in this instance by a reflex exposure technique.

Figure 2:
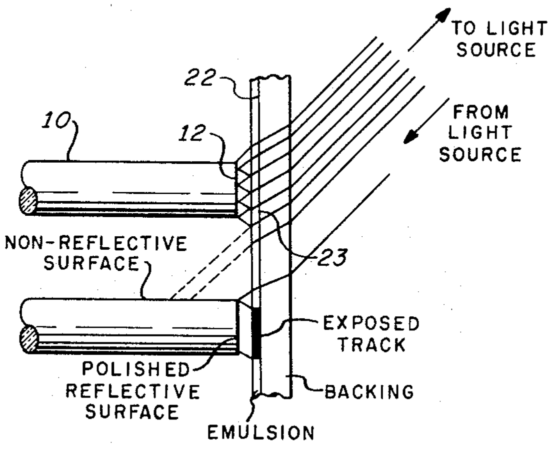
FIG. 2 is a schematic diagram partly in section showing the mechanics of reflex exposure of the mask of FIG. 1.

As shown more clearly in FIG. 2, the collimated light is passed through the undeveloped emulsion 22, and reflected from the polished ends 12 of the fibers 10 which results in an illuminated spot 23 on the emulsion 22. The portions of the film mask 23 which receive the reflected spots have approximately twice the exposure of the surrounding portion of the mask 13. By using high contrast type film, this difference in illumination represents the difference between exposure and non-exposure of the film mask 23 and a high contrast ratio can be obtained as shown in the attached graphs, FIGS. 3 and 4.

Figure 3:
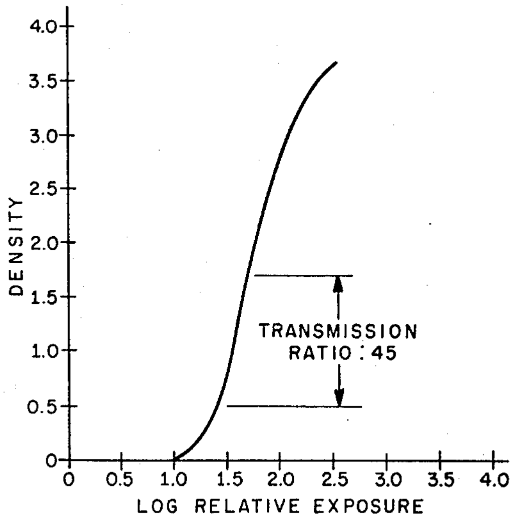
FIG. 3 is a graph of density vs. relative exposure of high contrast photographic film.

FIG. 3 represents the graph of the density versus the logarithmic relative exposure for high contrast photographic film.

Figure 4:
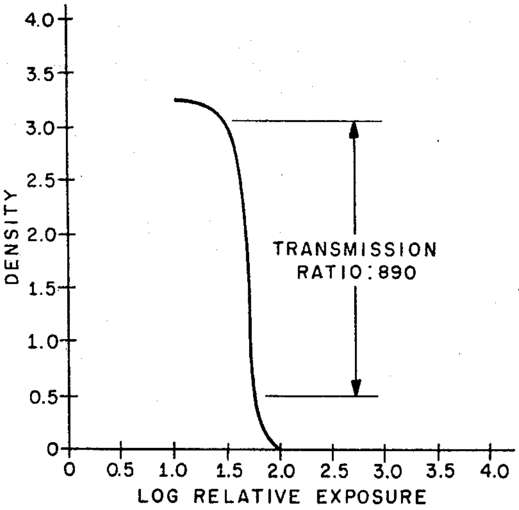
FIG. 4 is a graph of density vs. relative exposure of high contrast auto-positive film.

FIG. 4 is a similar graph made with respect to high contrast auto-positive film. The exposure density curves of the two high contrast films show that a relatively small difference in exposure can produce a relatively high difference in transmission ratio, i.e., 45 to 1 with respect to the film of FIG. 3 and 890 to 1 with respect to the film of FIG. 4 for a particular exposure interval.

Programming of this nature provides mask 13 which depending upon the type of mask desired, i.e., static, rejection, or acceptance, as explained in said U.S. patent application S.N. 284,712, will normally provide translucent portions corresponding to the amplitude of vibration of the fibers 10 excited with respect to the particular audio signal in order that when the signal is received, the same fibers 10 vibrate thereby transmitting the greatest amount of light to the photocell 17 which in turn provides a unique output signal to the signal utilization means 18. In the absence of this particular signal, the light reflected from the ends 12 of the fibers 10 to the photocell 17 is less than maximum and therefore an output signal corresponding to the lower amplitude is transmitted from the photocell 17 to the signal utilization means 18 and if, for example, the lower amplitude signal does not exceed a predetermined threshold, the signal utilization means 18 is not energized.

In the frequency analyzer described with respect to FIG. 1, the exact location of a fiber 10 corresponding to a particular frequency is not important since the mask 13 is programmed with respect to a particular audio signal and the photocell 17 provides an integrated output signal which may be correlated in the signal utilization means 18 with respect to said particular signal. However, in certain applications, for example, in a spectrum recorder, it is necessary that a fiber corresponding to a particular frequency be disposed at a particular location since frequency must be accurately displayed as a function of position across the width of a recording chart. This requires that each of the fibers corresponding to a particular frequency must be located at a particular position and also that a particular fiber be responsive to a high degree of accuracy to a particular frequency. In this respect metallic elements in the form of vibrating fibers or vibrating reeds are more accurate since they can be manufactured to closer dimensional tolerances than quartz fibers, for example.

Figure 5:
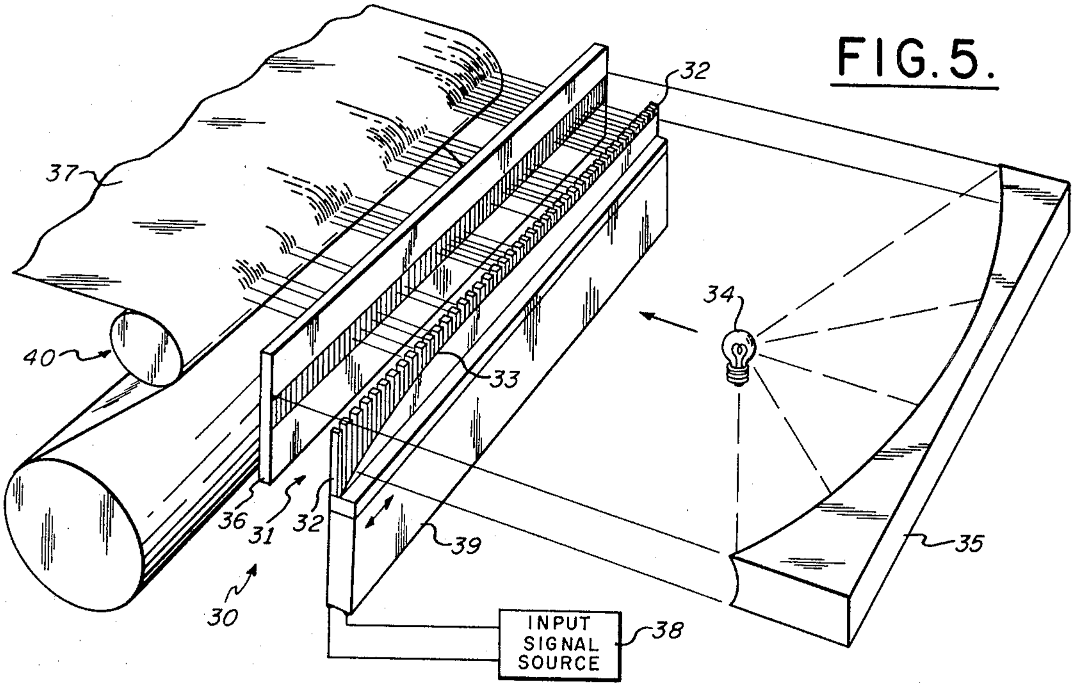
FIG. 5 is a schematic diagram in perspective of a spectrum correlator utilizing the present invention.

Referring to FIG. 5, a spectrum recorder 30 is shown containing an array 31 having a plurality of tuned metallic fibers or reeds 32. The fibers or reeds 32 preferably have a rectangular cross-section and a length which is varied in a smooth and continuous function as defined by the interface 33 to cover the frequency band desired, for example, 100 c.p.s. to 20 K c.p.s. A nickel alloy Ni-Span-C has generally acceptable properties and it is particularly desirable because of its thermoelastic coefficient which provides substantially the same resilient properties from −50 to +150°.

Each fiber 32 acts as a tuned filter whose natural resonant frequency is determined by the free fiber length, fiber material and mounting method. When frequency components of the input signal are present and correspond to the natural frequency of a particular fiber 32, that fiber 32 is excited into resonant motion.

As shown in FIG. 5, a light source 34 provides light which is collimated by a reflecting collimating lens 35 in order that the collimated light is focused on the fibers 32 of the array 31. A photographic mask 36, which represents a photographic negative, blocks light transmission to a photo-sensitive paper 37 disposed behind the mask 36 when the fibers 32 are not in motion. In the arrangement shown in FIG. 5, the array 31 is in the form of a shutter or comb where each fiber 32 in effect shadows a window in order that light is allowed to pass only when a fiber 32 is excited into resonant motion.

When an input signal is provided from the input signal source 38, an electromagnetic driver 39 mounted on the array 31 vibrates the fibers 32 in accordance therewith. Those fibers whose natural frequency corresponds to frequency components of the input signal are excited into motion permitting the collimated light to pass between the fibers 32 through the transparent portions of the mask 36 onto the photo-sensitive paper 37 to provide a trace representative of the frequencies present as a function of time. The photo-sensitive paper 37 may, for example, be disposed within a paper transport and processor 40 such as a "Data-Rite Processor," manufactured by Consolidated Electro-Dynamics Corporation.

Figure 6:
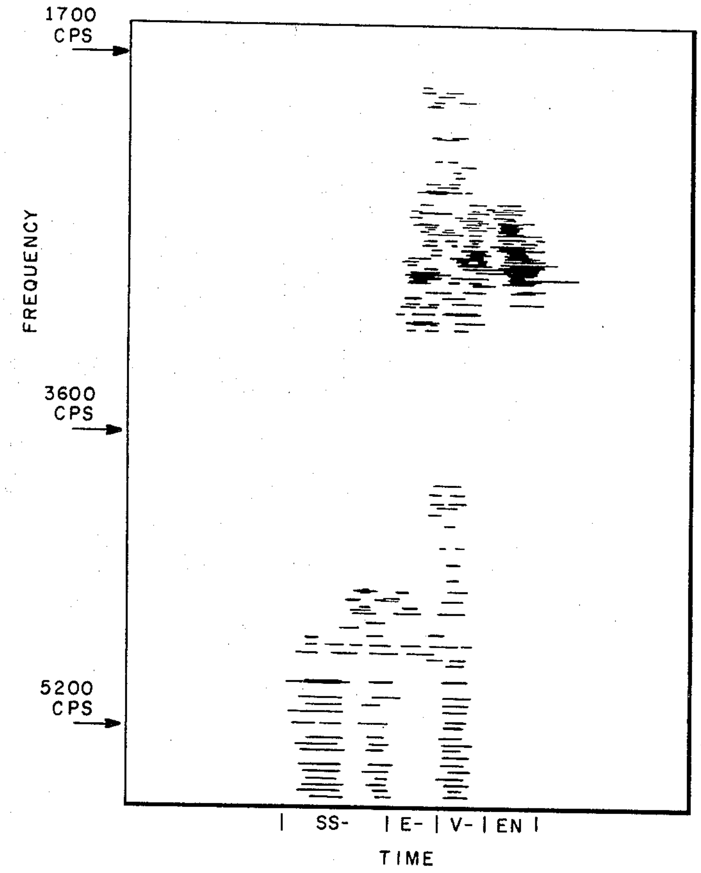
FIG. 6 is a voice signal spectrogram for the word "seven".

The results of a typical voice signal spectrogram is shown in FIG. 6 for the word "seven" and the output of individual fibers is easily discernible. Broad and gradual trends of frequency content with time are apparent. The spectrum collimator of the present invention differentiates between voices attempting to make the same sound as well as create a "signature" for each sound made by a particular individual. The operator can readily learn to read his own sounds in a relatively short time. The spectrum of the word "seven" is shown in FIG. 6 to contain some higher frequencies in the "s" sound and frequencies at varying energy levels in the "e," "v" and "en" sounds. The recording shown in FIG. 6 was taken in real time and exhibits a "signature" resolution capability greater than that of any similar real time apparatus known to be available presently.

In operation, collimated light incident on the fibers 32 from behind causes each fiber to cast its shadow on a static photographic mask. The mask 36 is originally made by exposure to light while shadowed by the fibers 32. The resultant negative is opaque everywhere except for a "window" behind each fiber 32. Excitation of the fibers 32 to resonance moves them aside from the windows thereby periodically allowing light to pass the mask 36 resulting in an output trace on the photo-sensitive paper 37 carried by the paper transport 40. The width of the output trace is determined by the fiber amplitude.

In lieu of utilizing a single array 31 having a continuous function to cover the frequency band, a plurality of smaller arrays 31 each covering a portion of the band may be utilized. The arrays 31 may be made in accordance with the teachings of U.S. patent application S.N. 285,551 entitled, "Method of Making Frequency Responsive Device," filed May 31, 1963, in the name of Hawkins et al., now Patent No. 3,333,278, or S.N. 363,470 having the same title and filed April 29, 1964, in the name of Colen et al., now Patent No. 3,333,279.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Frequency responsive apparatus comprising,
(a) means including a plurality of metallic energy controlling elements supported to extend from mounting means at unequal free lengths whereby said elements vibrate at individual preselected frequencies associated with their respective resonant frequencies in response to a plurality of frequencies which define a frequency spectrum,
(b) means for providing radiant energy to said elements, said elements being opaque to said radiant energy,
(c) means on said elements for transmitting said energy,
(d) means for receiving said energy,
(e) masking means disposed between said elements and said receiving means and programmed for transmitting said energy as a function of the relative motion between said elements and said masking means,
(f) transducer means responsive to an input signal for providing relative vibratory motion between said elements and said masking means as a function of said input signal whereby certain of said elements vibrate and others remain stationary, and
(g) means responsive to said receiving means for providing an output representative of the energy received thereby.

2. Frequency responsive apparatus comprising,
(a) means including a plurality of metallic energy reflecting elements supported to extend from mounting means at unequal free lengths whereby said elements vibrate at individual preselected frequencies associated with their respective resonant frequencies in response to a plurality of frequencies which define a frequency spectrum,
(b) means for providing radiant energy to said elements,
(c) reflecting means on said elements for transmitting said energy,
(d) means for receiving said energy,
(e) masking means disposed between said elements and said receiving means and programmed for passing said energy as a function of the relative motion between said elements and said masking means,
(f) transducer means responsive to an input signal for providing relative vibratory motion between said elements and said masking means as a function of said input signal whereby certain of said elements vibrate and others remain stationary, and
(g) means responsive to said receiving means for providing an output representative of the energy received thereby.

3. Frequency responsive apparatus comprising,
(a) means including a plurality of metallic light controlling elements supported to extend from mounting means at unequal free lengths as to vibrate at varying resonant frequencies as a function of their individual free lengths in response to a plurality of frequencies which define a frequency spectrum,
(b) means for providing a source of light to said elements, said elements being opaque to light,
(c) means on said elements for transmitting light,
(d) means for receiving said light,
(e) masking means disposed between said elements and said receiving means and programmed for transmitting said energy as a function of the relative motion between said elements and said masking means, (f) vibratory transducer means responsive to an input signal for providing relative vibratory motion between said elements and said masking means as a function of said input signal whereby certain of said elements vibrate and others remain relatively stationary, and
(g) means responsive to said receiving means for providing an output representative of a function of the light received thereby.

4. Frequency responsive apparatus comprising,
(a) means including a plurality of metallic light reflecting elements supported to extend from mounting means at unequal free lengths as to vibrate at varying resonant frequencies as a function of their individual free lengths in response to a plurality of frequencies which define a frequency spectrum,
(b) means for providing a source of light to said elements, said elements being opaque to light,
(c) reflecting means on said elements for transmitting light,
(d) means for receiving said light,
(e) masking means disposed between said elements and said receiving means and programmed for passing said energy as a function of the relative motion between said elements and said masking means,
(f) vibratory transducer means responsive to an input signal for providing relative vibratory motion between said elements and said masking means as a function of said input signal whereby certain of said elements vibrate and others remain stationary, and
(g) means responsive to said receiving means for providing an output representative of a function of the light received thereby.

References Cited

UNITED STATES PATENTS

| | | | |
|---|---|---|---|
| 2,875,353 | 2/1959 | Cavalieri et al. ______ | 310—8.2 |
| 3,224,279 | 12/1965 | Galli et al. _______ | 250—227 X |
| 3,248,552 | 4/1966 | Bryan ___________ | 250—213 X |
| 3,310,682 | 3/1967 | Potts et al. _______ | 250—231 X |

WALTER STOLWEIN, *Primary Examiner.*